Feb. 1, 1949.  K. E. CARROLL  2,460,735
COFFEE STEEPING BAG
Filed Dec. 1, 1947
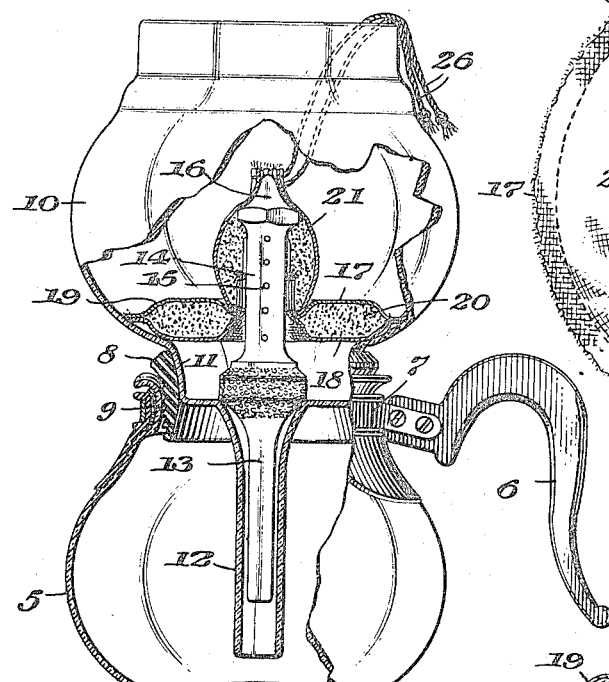
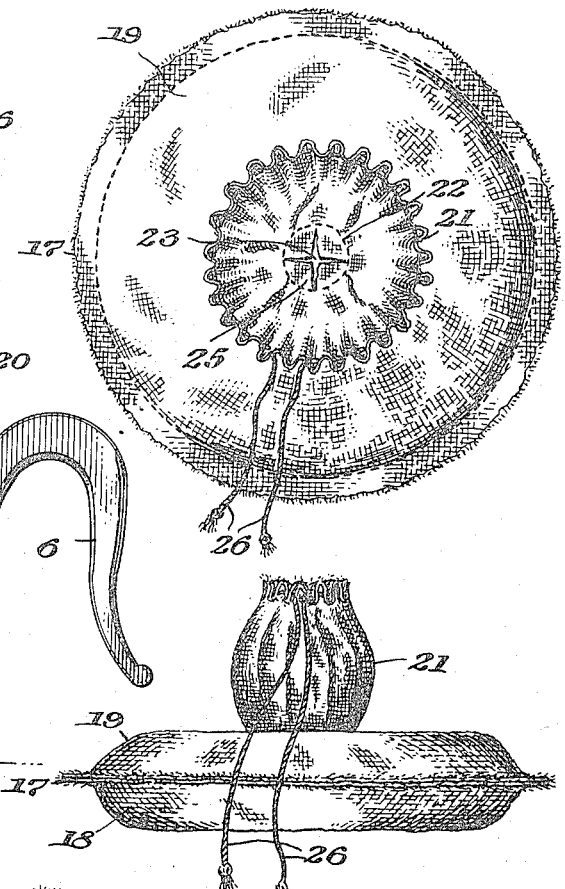
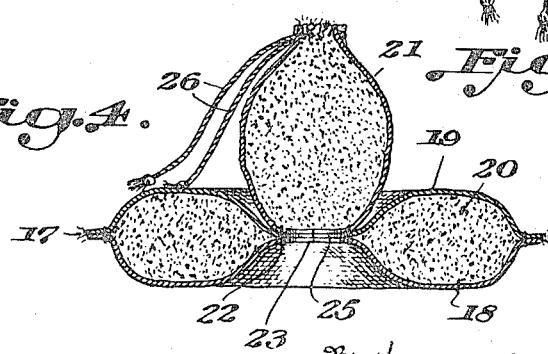
Inventor
K. E. Carroll,
By Mason, Porter, Miller & Stewart
attys.

Patented Feb. 1, 1949

2,460,735

UNITED STATES PATENT OFFICE 2,460,735

COFFEE STEEPING BAG

Katherine Ester Carroll, Prescott, Ariz.

Application December 1, 1947, Serial No. 789,092

6 Claims. (Cl. 99—77.1)

The following specification relates to my improved coffee steeping bag adapted for use especially with the present day equipment for percolating coffee. More particularly described, the bag is intended to supply a predetermined and measured quantity of ground coffee or the like in an expendable bag which will be convenient in use and readily disposed of.

A further object of my invention is to provide facility for increasing the quantity of coffee to be steeped without risk of its being carried into contact with the filtering means normally provided.

A still further object of my invention is to enable the user to remove the spent grounds in a convenient and efficient manner.

Other objects of my invention will be clearly apparent and evident from the following description of the preferred form as illustrated in the accompanying drawings.

In these drawings:

Fig. 1 is a side view partially in vertical cross section illustrating the manner in which may improved steeping bag is used in a popular form of coffee percolator;

Fig. 2 is an enlarged plan view of the steeping bag;

Fig. 3 is a side elevation of the same and

Fig. 4 is a vertical axial cross section of the bag as shown in Fig. 3.

A widely known type of coffee brewing equipment or percolator is that shown in Fig. 1. It consists of a lower pot 5 of heat resistant material, preferably glass, in which water may be brought to a boil. The pot has a handle 6 removably attached to the pot 5 by means of a collar 7.

The rubber ring or gasket 8 is adapted to fit within the upper neck 9 of the pot and form a steamtight seal.

The upper steeping vessel is in the form of a bowl 10 which is fitted removably but tightly into the rubber ring 8. The lower portion of the bowl 10 is extended to form a well 11 where it fits within the ring 8. An axial drain tube 12 extends vertically downward from the bowl 11 to within a short distance of the bottom of the pot 5.

The conventional percolator is completed by the addition of the removable percolating tube 13. This is open at the bottom and extends within the drain tube 12. The mid-portion 14 of the tube 13 is roughened in the zone where it rests upon the bottom of the well 11. This roughness is sufficient to permit drainage of the coffee extracted but at the same time to prevent escape of the ground coffee.

The upper portion of the tube 13 has a plurality of holes 15 out of which the boiling water may escape into the bowl 10. The upper end of the tube 13 terminates in a conical closed portion 16.

In ordinary operation, coffee ground to the requisite fineness is added to the well 11 in an amount calculated for the volume of the water contained in the pot 5. If the pot is then heated, the water is lifted by the trapped steam pressure into the percolating tube and out of the holes 15. It then drains back through the granular coffee and into the pot 5 and is especially rapid when the pot is no longer subject to heat but the entrapped steam is allowed to condense.

It is always a matter of convenience for the user of this equipment to have the requisite amount of coffee already packaged for placing in the bowl 11. This, however, does not provide sufficient flexibility to allow for added quantity. To overcome this disadvantage, I have designed a package which contains a normal quantity of ground coffee but at the same time provides for receiving and holding an additional quantity whenever the need arises.

As the drawings illustrate, my improved bag 17 is an envelope made from three discs of porous tissue, film or textile fabric. The material is such that it will serve as a filter to prevent the escape of the ground coffee. However, it permits the ready passage of boiling water and the coffee extracted.

The lower disc 18 and the middle disc 19 are stitched together at the periphery to form the bag in which the coffee 20 has been placed. A third disc 21 of the same general dimensions rests upon the middle disc 19. The three discs are stitched together as at 22 to form a central eye 23 and give the bag made of the discs 18 and 19 the form of a tore. By slitting the fabric diametrically as shown at 24 in two or more directions, the eye has a star-shaped opening formed by the flaps 25 of the 3-ply material. This stitching 22 also confines the coffee in the bag but excludes it from the central area or eye.

A drawstring 26 is threaded around the periphery of the upper disc 21. By means of this the upper disc 21 may be drawn up to form a bag, the bottom of which is formed by the flaps 25 of the central eye 23.

Assuming that the toric bag formed by the discs 18 and 19 contains a normal quantity of coffee, it is fitted over the upper end 16 of the percolating tube either before or after the latter has been fitted over the well 11 and drain tube 12. In this arrangement of parts the flaps 25 are spread apart and fit snugly around the side wall of the mid-portion 14 of the percolating tube. They thus form a very satisfactory means for centering the bag on the tube and insure the hot water raised by the steam passing through the bag rather than back around the stem of the percolating tube.

In order to adapt the percolator for the production of a stronger brew or one containing a larger quantity of extract, use is made of the bag 27 formed by the upper disc 21. With the bag partially open, the extra amount of ground coffee needed can be put in the bag and the opening tightened by the drawstring.

If this is done before the bag is fitted around the percolating tube portion 14, then escape of the ground coffee is prevented by the normal closed position of the flaps 25. The flaps, however, open up when the conical end portion of the tube 16 is inserted. After the insertion of the tube, the flaps extend vertically as shown in Fig. 1 and thus prevent the escape of the confined granular coffee.

Optionally, the bag formed by the disc 21 may be filled after the device has been dropped into the bowl 10 and around the upwardly projecting mid-portion 14 of the tube 13. The drawstring is then tightened to confine the extra coffee.

As the bowl 10 has an open top, it is most convenient to leave the ends of the tightened drawstring projecting out. This facilitates the removal of the steeping bag and the spent coffee grounds after the extraction has been completed.

As shown clearly in Fig. 1 of the drawing, the supplemental bag formed by the upper disc 21 provides a materially greater area of contact between the mass of the coffee and the boiling water lifted into the bowl 10 through the percolating tube 13. In this way the operation of steeping the coffee consumes practically the same amount of time even though the quantity of ground coffee being steeped has been increased by the amount carried within the disc 21.

The above description and drawing applies to the preferred form of my invention. However, it will be apparent that the advantages may also be obtained by considerable variation in material and proportions without departing from the scope of the invention as defined in the following claims.

What I claim is:

1. An improved coffee steeping bag comprising three discs of porous flexible material stitched together around the center to form a circle, said circle being diametrically slit in a plurality of directions, a row of stitching peripherally of the bottom and middle discs to form them into a tore to hold granular coffee, and a drawstring threaded peripherally through the upper disc to form it into a sack.

2. An improved coffee steeping bag comprising three discs of porous flexible materials stitched together around the center to form a circle, said circle being diametrically slit in a plurality of directions to provide centrally extending flexible flaps, a row of stitching peripherally of the bottom and middle discs to form them into a tore to hold granular coffee, and a drawstring threaded peripherally through the upper disc to form it into a sack.

3. An improved coffee steeping bag comprising three discs of porous flexible material stitched together around the center to form a circle, said circle being diametrically slit in a plurality of directions to provide centrally extending flexible flaps adapted to fit closely around the central tube of a percolator, a row of stitching peripherally of the bottom and middle discs to form them into a sack, and a drawstring threaded peripherally through the upper disc to close it over the upper end of the said percolator tube.

4. An improved coffee steeping bag comprising three discs of porous flexible material stitched together around the center to form a sack bottom, a row of stitching peripherally of the bottom and middle discs to form them into a toric sack, and a drawstring threaded peripherally through the upper disc to draw it into an upstanding sack over said bottom and centrally of the toric sack.

5. An improved coffee steeping bag comprising three centrally attached discs of porous flexible material, two of said discs forming a toric envelope, and the third disc having its outer edge drawn together to form the disc into a central upstanding sack.

6. An improved coffee steeping bag comprising a main compartment formed of two disks of porous fabric having circular stitching around the center and also peripherally to form a non-refillable compartment and an auxiliary compartment formed of a third disk of fabric attached to the main compartment by the inner circular stitching and having a draw-string around its periphery.

KATHERINE ESTER CARROLL.

REFERENCES CITED

The following references are of record in the file of this patent:

UNITED STATES PATENTS

| Number | Name | Date |
|---|---|---|
| 933,917 | Norwood | Sept. 14, 1909 |
| 1,454,739 | Holland | May 8, 1923 |
| 1,625,620 | Maston | Apr. 19, 1927 |
| 1,947,523 | Hirschhorn | Feb. 20, 1934 |